(12) United States Patent
Hall et al.

(10) Patent No.: US 9,709,023 B2
(45) Date of Patent: Jul. 18, 2017

(54) SHUT OFF VALVE FOR OSCILLATING WATER COLUMN TURBINES

(71) Applicants: Russell Hall, Peterborough (GB); Shahab Natanzi, Peterborough (GB)

(72) Inventors: Russell Hall, Peterborough (GB); Shahab Natanzi, Peterborough (GB)

(73) Assignee: Dresser-Rand Company, Olean, NY (US)

( * ) Notice: Subject to any disclaimer, the term of this patent is extended or adjusted under 35 U.S.C. 154(b) by 330 days.

(21) Appl. No.: 14/285,664

(22) Filed: May 23, 2014

(65) Prior Publication Data

US 2014/0356139 A1 Dec. 4, 2014

Related U.S. Application Data

(60) Provisional application No. 61/830,541, filed on Jun. 3, 2013.

(51) Int. Cl.
| | |
|---|---|
| F03B 13/12 | (2006.01) |
| F03B 15/04 | (2006.01) |
| F03B 13/14 | (2006.01) |
| F03B 11/00 | (2006.01) |

(52) U.S. Cl.
CPC .......... *F03B 15/04* (2013.01); *F03B 11/004* (2013.01); *F03B 13/142* (2013.01); *Y02E 10/226* (2013.01); *Y02E 10/32* (2013.01); *Y02E 10/38* (2013.01)

(58) Field of Classification Search
CPC ........ F03B 3/183; F03B 15/04; F03B 11/004; F03B 13/142; Y02E 10/38; Y02E 10/32; Y02E 10/226

USPC .......................... 415/155, 151, 3.1, 159, 71
See application file for complete search history.

(56) References Cited

U.S. PATENT DOCUMENTS

| | | | |
|---|---|---|---|
| 4,484,857 A | 11/1984 | Patin | |
| 6,820,333 B2 | 11/2004 | Shimmei et al. | |
| 7,471,009 B2 | 12/2008 | Davis et al. | |
| 8,286,425 B2 | 10/2012 | Maier | |
| 2009/0097966 A1* | 4/2009 | McCaffrey | F01D 17/162 415/130 |
| 2010/0209236 A1* | 8/2010 | Freeman | F01D 1/02 415/208.1 |

(Continued)

FOREIGN PATENT DOCUMENTS

| | | |
|---|---|---|
| EP | 2538070 A2 | 12/2012 |
| JP | 2011074854 A | 4/2011 |
| WO | 2011050229 A2 | 4/2011 |

OTHER PUBLICATIONS

European Patent Office, "Extended European Search Report and the European Search Opinion—EP14806939", dated Dec. 12, 2016, 7 pages.

(Continued)

*Primary Examiner* — Jason Shanske
*Assistant Examiner* — Kelsey Stanek (57) ABSTRACT

A shut-off valve for a turbine of an oscillating water column may include a plurality of guide vanes configured to control a fluid flow into a flow passage defined by the turbine. The plurality of guide vanes may be at least partially disposed within the flow passage and may include a plurality of fixed guide vanes and a plurality of movable guide vanes. The plurality of fixed guide vanes and the plurality of movable guide vanes may be sequentially disposed in an alternating pattern in the flow passage.

19 Claims, 6 Drawing Sheets

(56) References Cited

U.S. PATENT DOCUMENTS

2011/0252779 A1   10/2011  Maier
2012/0121403 A1*  5/2012  Clemons ............... F01D 17/162
                                                              415/208.1
2014/0119897 A1*  5/2014  Ishii ....................... F03B 3/183
                                                              415/159

OTHER PUBLICATIONS

Australian Patent Office, "Examiner's Report—AU2014275291", dated Feb. 17, 2017, 3 pages.

* cited by examiner

SHUT OFF VALVE FOR OSCILLATING WATER COLUMN TURBINES

CROSS-REFERENCE TO RELATED APPLICATIONS

This application claims priority to U.S. Provisional Patent Application having Ser. No. 61/830,541, which was filed Jun. 3, 2013. This priority application is hereby incorporated by reference in its entirety into the present application to the extent consistent with the present application.

BACKGROUND

An Oscillating Water Column (OWC) is a marine renewable energy device, designed to extract power from ocean waters. Generally, the OWC includes a chamber open to the surface of the sea and a turbine. The turbine is required to convert the bi-directional air flow produced by the rising and falling sea surface within the chamber into unidirectional rotary motion of a shaft of the turbine, which is then used to power a generator to generate electricity. Impulse type turbines with fixed guide vanes have been developed. However, the fixed guide vanes do not permit isolation of the turbine rotor from the incoming pneumatic power. As a result, the turbine cannot be stopped during period of excessive input power, for example, during storms. Also, carrying out planned shutdown operations, such as maintenance activities, is difficult.

What is needed then is an OWC that permits controlled shut down of the turbine.

SUMMARY

Example embodiments of the disclosure provide a shut-off valve for a turbine of an oscillating water column. The shut-off valve may include a plurality of guide vanes configured to control a fluid flow into a flow passage defined by the turbine. The plurality of guide vanes may include a plurality of fixed guide vanes and a plurality of movable guide vanes. The plurality of guide vanes may be at least partially disposed within the flow passage.

Example embodiments of the disclosure provide an oscillating water column turbine. The oscillating water column turbine may include a shaft configured to rotate about a central axis, first and second annular ports disposed about the central axis, rotor blades coupled with or integral with the shaft and disposed between the first and second annular ports, a flow passage extending between the first and second annular ports, and a shut-off valve including first guide vanes and second guide vanes. The rotor blades may intersect the flow passage. The first guide vanes may be disposed proximal the first annular port and may be configured to control a first fluid flow into the flow passage. The first guide vanes may include first fixed guide vanes and first movable guide vanes. The second guide vanes may be disposed proximal the second port. The second guide vanes may be configured to control a second fluid flow into the flow passage. The second guide vanes may include second fixed guide vanes and second movable guide vanes.

Example embodiments of the disclosure provide an apparatus for extracting energy from a bi-directional fluid flow. The apparatus may include a shaft configured to rotate about a central axis, first and second annular ports disposed about the central axis, and a flow passage extending between the first and second annular ports. At least a portion of the flow passage may extend axially around the shaft and the flow passage may be configured to receive the bi-directional fluid flow. The apparatus may further include rotor blades coupled with or integral with the shaft and intersecting the flow passage, and a shut-off valve including first guide vanes and second guide vanes. The rotor blades may be configured to receive the bi-directional fluid flow and rotate the shaft. The first guide vanes may be disposed proximate the first annular port and may be configured to control the bi-directional fluid flow into the flow passage. The first guide vanes may include first fixed guide vanes and first movable guide vanes. Each first movable guide vane may be disposed between two first fixed guide vanes. The second guide vanes may be disposed proximate the second annular port and may be configured to control the bi-directional fluid flow into the flow passage. The second guide vanes may include second fixed guide vanes and second movable guide vanes. Each second movable guide vane may be disposed between two second fixed guide vanes.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
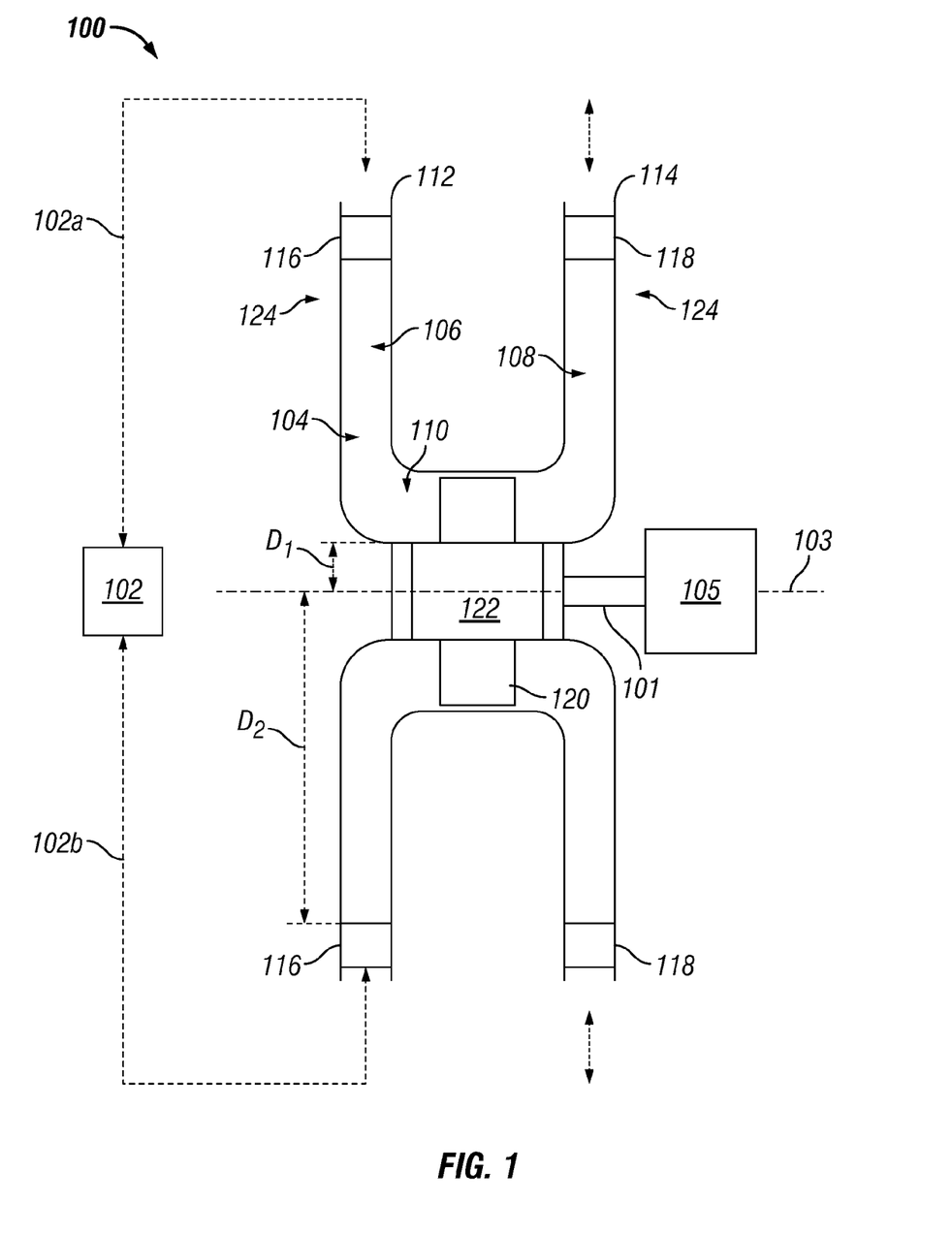
FIG. 1 illustrates a schematic view of an oscillating water column turbine, according to example embodiments.

FIG. 1 illustrates a schematic view of an oscillating water column turbine (hereafter, "turbine") 100, according to example embodiments. The turbine 100 may be fluidly coupled to a wave chamber 102, as depicted by arrows 102a, 102b. The wave chamber 102 may be any wave chamber known in the art, for example, as described in either of U.S. Pat. Nos. 8,596,955 and 8,286,425, which are incorporated herein by reference in their entirety to the extent consistent with the present disclosure. The wave chamber 102 may be cylindrical or may be a volute, among other examples contemplated, and may have one end disposed below the surface of the water and one end above so as to house an oscillating water column therein.

The shaft 101 of the turbine 100 extends therethrough along a central axis 103, about which the shaft 101 rotates. The shaft 101 may be coupled to a generator 105, for example, directly thereto. In some embodiments, the shaft 101 may be coupled to the generator 105 via a gear box (not shown), slip coupling, or any other speed-changing device. In other embodiments, the turbine 100 may also be coupled to a compressor, pump, fan, or other type of rotating machine, with or without a gearbox and with or without a generator, as desired.

In the example embodiment illustrated in FIG. 1, the turbine 100 defines a flow passage 104, which may be an annulus of varying diameter, and may have a double U-shaped profile or cross-section. As such, the flow passage 104 may generally include first and second radially-extending sections 106, 108 and an axially-extending section 110 disposed therebetween, such that the flow passage 104 is generally symmetrical about the central axis 103 of the shaft 101, a line perpendicular thereto, or both, as shown. It will be appreciated that the turbine 100 can be rotated to a horizontal configuration, or any other orientation, without departing from the scope of this disclosure. The first and second radially-extending sections 106, 108 may extend in a true radial direction, i.e., directly perpendicular to the central axis 103, as shown, or can gradually curve from straight radial to axial, while still falling within the definition of "radially-extending." Similarly, the axially-extending section 110 may extend parallel to the central axis 103 and around the shaft 101, but may also curve toward radial to seamlessly couple with the first and second radially-extending sections 106, 108, while still falling within the definition of "axially-extending."

The flow passage 104 may also include the first and second ports 112, 114, which are defined at each terminus of the flow passage 104. The first and second ports 112, 114 may be radially oriented with respect to the central axis 103, as shown. Further, the first and second ports 112, 114 may be disposed circumferentially about the central axis 103, so as to provide an annular inlet and outlet. As such, the first and second ports 112, 114 may define the outer radial extents of the flow passage 104 and may allow passage of bi-directional fluid to and from the wave chamber 102 (bi-directional fluid flow).

The turbine 100 may also include first and second rows or sets of guide vanes (hereafter referred to simply as "first and second guide vanes") 116, 118 disposed proximal the outer radial extents of the flow passage 104, and may serve to guide the incoming fluid into rotor blades 120. For example, at least the first guide vanes 116 may be positioned in the first radially-extending section 106 and the second guide vanes 118 may be positioned in the second radially-extending section 108. The first guide vanes 116 may be disposed closer to the first port 112 than to the central axis 103 and the second guide vanes 118 may be disposed closer to the second port 114 than to the central axis 103. As such, the first and second guide vanes 116, 118 may be described herein as being "disposed proximal" the first and second ports 112, 114, respectively. Moreover, although shown as extending entirely through the first and second radially-extending sections 106, 108, respectively, it will be appreciated that either of the first and second guide vanes 116, 118 may extend partially therethrough. The first and second guide vanes 116, 118 may be disposed at equal intervals along the first and second ports 112, 114.

The first and second guide vanes 116, 118 may constitute at least in part a shut-off valve 124 configured to prevent fluid from flowing into the flow passage 104. As described in example embodiments below, in the shut-off valve 124, every other guide vane in the first and second guide vanes 116, 118 may be fixed (immovable) and a guide vane between two fixed guide vanes may be movable. The movable guide vane may be rotated to close the first and second ports 112, 114 and thereby prevent fluid from entering the flow passage 104 and reaching the rotor blades 120.

The turbine 100 also includes rotor blades 120, which are disposed in the axially-extending section 110 of the flow passage 104. The rotor blades 120 may be, for example, impulse blades, such that the rotor blades 120 are caused to turn by impulsive interaction with the fluid flow; however, reaction blades could be used without departing from the scope of the present disclosure. The rotor blades 120 may extend from the shaft 101 and may be coupled (e.g., welded, brazed, fastened, or integrally-formed) therewith, for example, via a hub 122. The rotor blades 120 may extend entirely or partially through the axially-extending section 110 of the flow passage 104 and may be configured to rotate about the central axis 103. The rotor blades 120 may be configured to rotate the shaft 101 and thereby absorbing the energy received via impulse with the fluid. Further, the rotor blades 120 may be offset from the central axis 103 by a first distance $D_1$, which may be generally equal to the radius of the hub 122 (or the shaft 101, if the hub 122 is omitted). The first and second guide vanes 116, 118 may be offset from the central axis 103 by a second distance $D_2$. As shown, the second distance $D_2$ can be considerably greater than the first distance $D_1$.

In operation of the example turbine 100, fluid may flow into or out of the wave chamber 102 as indicated by arrows 102*a,b*, according to whether the water level is rising ("upstroke) or falling ("downstroke") by wave action therein. During an upstroke, the first port 112 may receive the fluid (e.g., air) into the first radially-extending section 106 of the flow passage 104. The fluid may then proceed radially-inward in the first radially-extending section 106. The fluid then enters the axially-extending section 110 and impinges on the rotor blades 120, causing the rotor blades 120 to rotate the shaft 101.

After energy extraction in the rotor blades 120, the fluid (for example, having a reduced velocity and/or pressure) may proceed radially-outward through the second radially-extending section 108 of the flow passage 104. The reverse effect experienced in the first radially-extending section 106 is experienced as the fluid flows radially-outward. The fluid then proceeds past the second guide vanes 118 and radially-outward through the second port 114 and to the environment, a bladder, or any other suitable device, location, or structure, thereby completing the flowpath for the turbine 100 on the upstroke.

On a downstroke, the process is reversed, but is otherwise generally the same. The fluid flows into the flow passage 104 through the second port 114. The reverse flow of fluid then impinges on the rotor blades 120 causing the rotor blades 120 to rotate in the same direction as during the upstroke, flows out of the flow passage 104 via the first port 112, and back into the wave chamber 102, as indicated by arrows 102*a,b*.

Figure 2A:
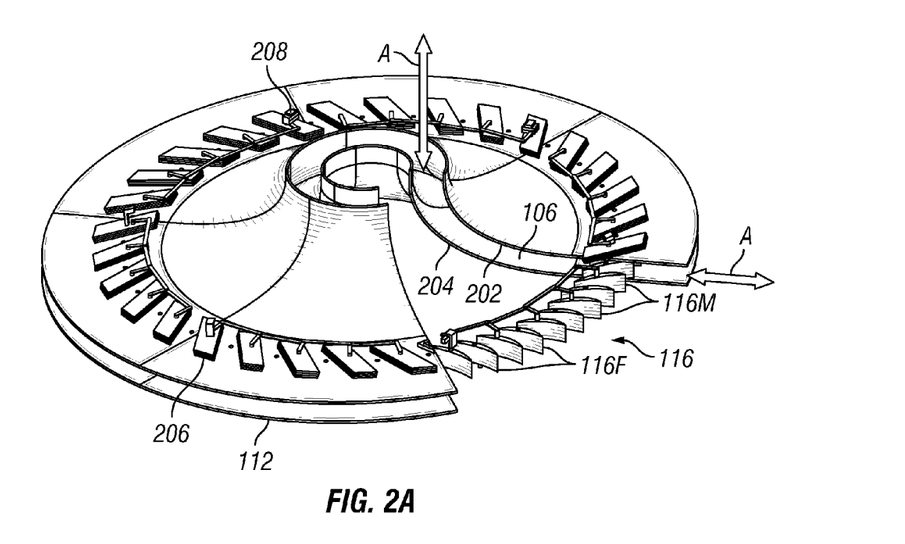
FIG. 2A illustrates a perspective view of a lower portion of the turbine of FIG. 1 including a first port and first guide vanes.

FIG. 2A illustrates a perspective view of a lower portion of the turbine 100 (portion between the rotor blades 120 and the first port 112) including the first port 112 and the first guide vanes 116. As will be understood, an upper portion (portion between the rotor blades 120 and the second port 114) of the turbine 100 including the second port 114 and the second guide vanes 118 may be similar to the lower portion illustrated in FIG. 2A; thus, only the lower portion shown in FIG. 2A will be referenced for illustrative purposes. As illustrated in FIG. 2A, the lower portion may be formed by multiple upper and lower sections 202, 204 and these upper and lower sections 202, 204 may define the first radially-extending section 106 of the flow passage 104 therebetween. One of the upper and lower sections 202, 204 are removed in FIG. 2A to more clearly illustrate the first guide vanes 116 disposed circumferentially at regular intervals in the flow passage 104 and proximal the first port 112. Bi-directional block arrows A in FIG. 2A illustrate the direction of the flow of fluid from the wave chamber 102.

As mentioned above, each other guide vane 116F of the first guide vanes 116 may be fixed (immovable) and a movable guide vane 116M may be disposed between two fixed guide vanes 116F. As such, the first guide vanes 116 may alternate between fixed and movable guide vanes 116F, 116M. Stated otherwise, the fixed and movable guide vanes 116F and 116M may be sequentially disposed in an alternating pattern in the flow passage 104. The fixed guide vanes 116F may provide a structural connection between the upper and lower sections 202, 204 and the movable guide vanes 116M may operate in the flow passage 104 defined by the upper and lower sections 202, 204. Each movable guide vane 116M may be mounted to a mounting plate 206 which in turn may be coupled to the upper section 202. Each fixed guide vane 116F may also be coupled to the upper section 202 via a mounting plate 206 or the fixed guide vane 116F may be directly affixed to the upper section 202, in which case the mounting plate 206 may be absent. Each fixed and movable guide vane 116F, 116M and the corresponding mounting plate 206 (if present) may be removable and are thus replaceable and serviceable with relative ease.

Figure 2B:
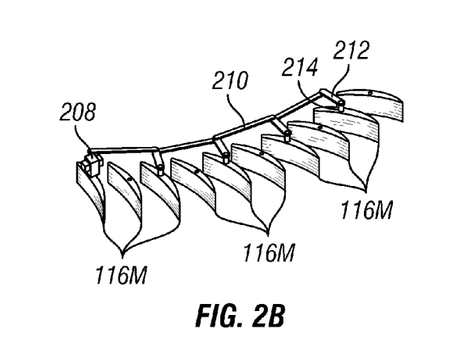
FIG. 2B illustrates a portion of the first guide vanes with the movable guide vanes in an open position.

The movable guide vanes 116M may be actuated via an actuator 208 (pneumatic, electrical, or the like) disposed on or adjacent the upper sections 202. In an example embodiment, each actuator may be configured to actuate a group of movable guide vanes 116M via a system of linkages 210. FIG. 2B illustrates a system of linkages 210 and the accompanying actuator 208. Also, as illustrated in the FIG. 2B, the movable guide vanes 116M are in an open position to permit fluid to enter the flow passage 104. The system of linkages 210 may be coupled to a stub shaft 212 which may be coupled to a pivot shaft 214. The movable guide vanes 116M may be coupled to the stub shaft 212 via the pivot shaft 214. One end of the pivot shaft 214 may be connected to the movable guide vane 116M and the other end may extend above the upper section 202 and may be connected to the stub shaft 212.

Figure 2C:
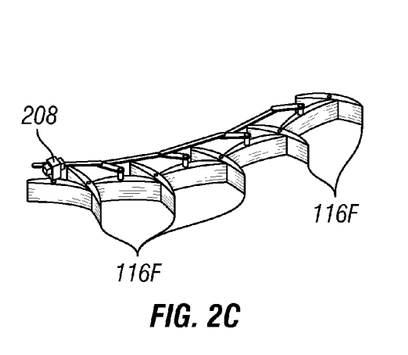
FIG. 2C illustrates a portion of the first guide vanes with the movable guide vanes in a closed position.

When the actuator 208 moves the linkages 210, the stub shaft 212 may rotate the pivot shaft 214. Rotation of the pivot shaft 214 may cause the movable guide vanes 116M to rotate, for example, about an axis parallel to the central axis 103. When the movable guide vanes 116M rotate, a leading edge and a trailing edge thereof may contact the adjacent fixed guide vanes 116F and place the movable guide vanes 116M in a closed position. This may in turn close the first port 112 and prevent fluid from entering the flow passage 104. It should be noted that the leading and trailing edges may refer to the edges of the movable guide vanes 116M with respect to the fluid flow entering the flow passage 104. Herein, the fluid flow contacts the leading edge of the movable guide vanes 116M prior to contacting the trailing edge of the movable guide vanes 116M. FIG. 2C illustrates a portion of the first guide vanes 116 with the movable guide vanes 116M in a closed position. In example embodiments, the actuator 208 may be attached to individual movable guide vanes 116M or, alternatively and as illustrated in FIGS. 2B-2C, two or more movable guide vanes 116M may be attached together via the linkage 210 and operated by a single actuator 208. A rotary shaft seal (not illustrated) on the pivot shaft 214 may prevent leakage of fluid from the flow passage 104 to the atmosphere.

Figure 3:
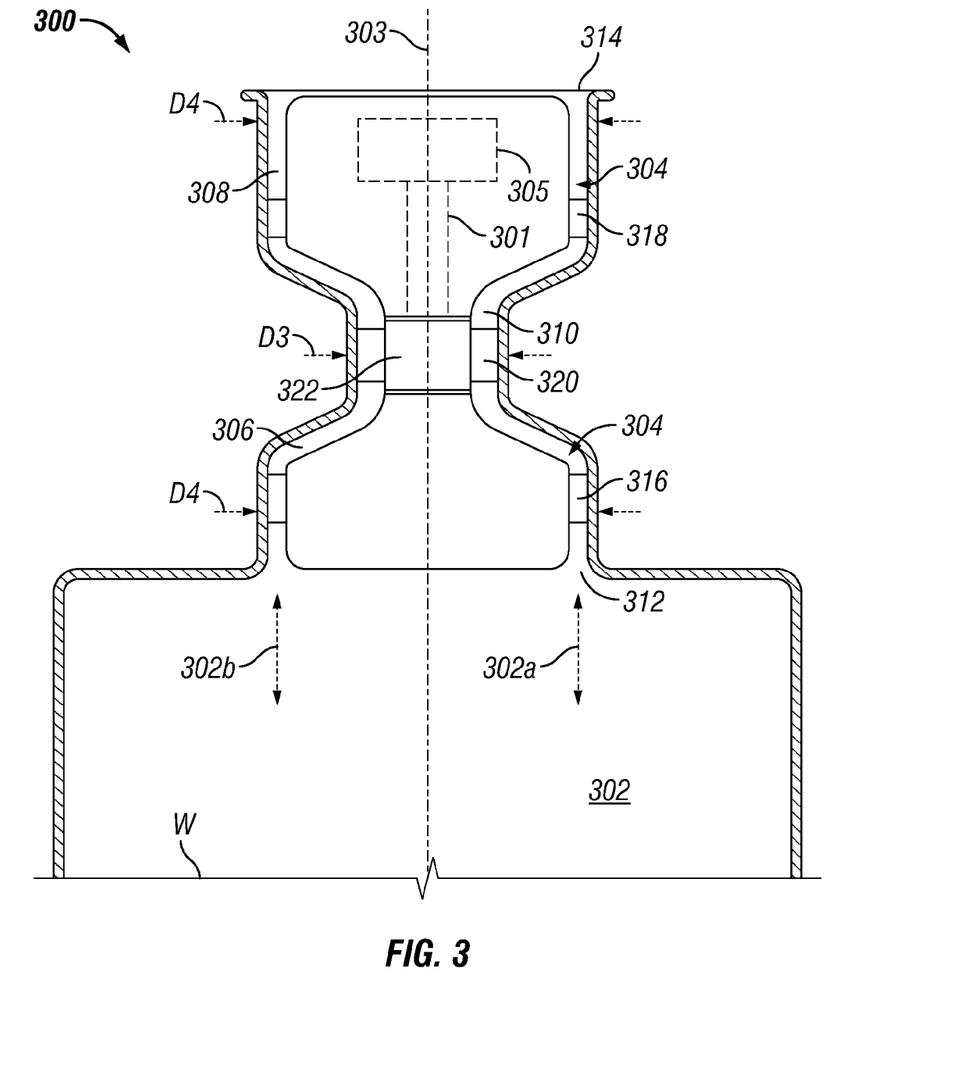
FIG. 3 illustrates a schematic view of another oscillating water column turbine, according to example embodiments.

FIG. 3 illustrates a schematic view of an oscillating water column turbine, according to another example embodiment. The oscillating water column turbine (hereafter, "turbine") 300 may be fluidly coupled to the wave chamber 302, as depicted by arrows 302*a*, 302*b*. The wave chamber 302 may be somewhat similar to the wave chamber 102 described above.

A shaft 301 of the turbine 300 extends therethrough along a central axis 303, about which the shaft 301 rotates. The shaft 301 may be coupled to a generator 305, for example, directly thereto. In some embodiments, the shaft 301 may be coupled to the generator 305 via a gear box (not shown), slip coupling, or any other speed-changing device. In other embodiments, the turbine 300 may also be coupled to a compressor, pump, fan, or other type of rotating machine, with or without a gearbox and with or without a generator, as desired.

The turbine 300 defines a flow passage 304, which is an annulus of varying diameter. The flow passage 304 includes first, second, and third axially-extending sections 306, 308, 310, such that the flow passage 304 is generally symmetrical about the central axis 303. The diameter D3 of the third axially-extending section 310 may be less than the diameters D4 of the first and second axially-extending sections 306, 308. As such, the turbine 300 may generally be hourglass shaped with a "neck" defined in the area of the third axially-extending section 310. The first, second, and third radially-extending sections 306, 308, 310 may extend in a true axial direction, i.e., parallel to the central axis 303, as shown, or may gradually curve from straight axial to radial, while still falling within the definition of "axially-extending."

The flow passage 304 also includes first and second ports 312, 314, which are defined at each terminus of the flow passage 304. The first and second ports 312, 314 may be axially oriented with respect to the central axis 303, as shown. Further, the first and second ports 312, 314 may be disposed circumferentially around the central axis 303, so as to provide an annular inlet and outlet. As such, the first and second ports 312, 314 may define the outer axial extents of the flow passage 304.

As shown in FIG. 3, the turbine 300 includes first guide vanes 316 positioned in the first axially-extending section 306 and second guide vanes 318 positioned in the second axially-extending section 308. The first guide vanes 316 may be disposed closer to the first port 312 than to the third axially-extending section 310 and the second guide vanes 318 may be disposed closer to the second port 314 than to the third axially-extending section 310. As such, the first and second guide vanes 316, 318 may be described herein as being "disposed proximal" the first and second ports 312, 314, respectively. The first and second guide vanes 316, 318 may extend entirely or partially through the first and second axially-extending sections 306, 308, respectively, of the flow passage 304.

Similar to the turbine 200, the turbine 300 also includes rotor blades 320, which are disposed in the third axially-extending section 310 of the flow passage 304. The rotor blades 320 may be, for example, impulse blades, such that the rotor blades 320 are caused to turn by impulsive interaction with the fluid flow; however, reaction blades could be used without departing from the scope of the present disclosure. The rotor blades 320 extend from the shaft 301 and are coupled (e.g., welded, brazed, fastened, or integrally-formed) therewith, for example, via a hub 322. The rotor blades 320 may extend entirely or partially through the third axially-extending section 310 of the flow passage 304 and are configured to rotate about the central axis 303. As such, the rotor blades 320 are offset from the central axis 303 by a distance considerably less than a distance by which the first and second guide vanes 316, 318 are offset from the central axis 303. The rotor blades 320 may be impulse blades, configured to rotate the shaft 301 by turning the fluid and thereby absorbing the energy received via impulse with the fluid.

The operation of the turbine 300 may be similar to the turbine 200 and is omitted herein for the sake of brevity.

Figure 4A:
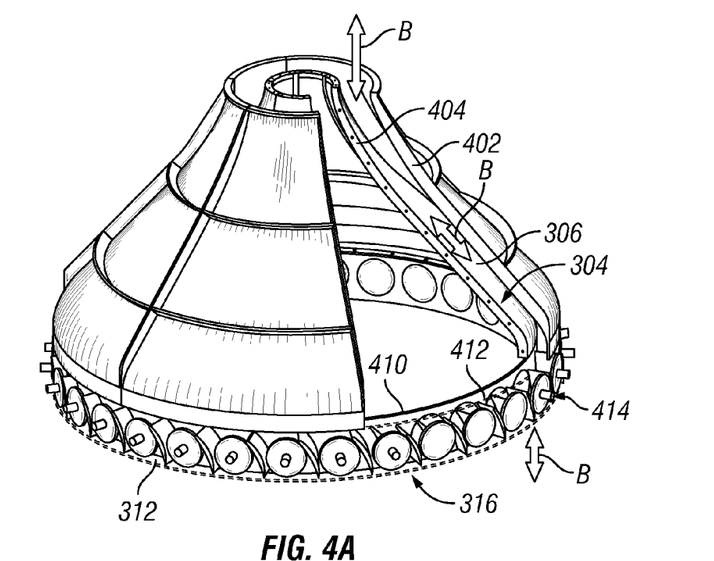
FIG. 4A illustrates a perspective view of a lower portion of the turbine of FIG. 3 including the first port and the first guide vanes.

FIG. 4A illustrates a perspective view of a lower portion of the turbine 300 (portion between the rotor blades 320 and the first port 312) including the first port 312 and the first guide vanes 316. As will be understood, an upper portion (portion between the rotor blades 320 and the second port 314) of the turbine 100 including the second port 314 and the second guide vanes 318 may be similar to the lower portion illustrated in FIG. 4A thus, only the lower portion shown in FIG. 4A will be referenced for illustrative purposes. As illustrated in FIG. 4A, the lower portion may be formed by multiple upper and lower sections 402, 404 defining the first axially-extending section 306 of the flow passage 304 therebetween. As in FIG. 2A, one of the upper section and lower sections 402, 404 are removed in FIG. 4A to more clearly illustrate the first guide vanes 316 disposed circumferentially at regular intervals proximal the first port 312. FIG. 4A also illustrates a shut-off valve 414 comprising the first guide vanes 316 disposed between two concentric inner and outer circular plates 410, 412 (illustrated in phantom). The shut-off valve 414 is coupled to the upper and lower sections 402, 404 of the lower portion of the turbine 300. However, in another example embodiment, the first guide vanes 316 may be disposed directly between the upper and lower sections 402, 404. In either example embodiment, the first guide vanes 316 (and the second guide vanes 318) may prevent fluid from entering the flow passage 304, as explained below. Bi-directional block arrows B in FIG. 4A illustrate the direction of the flow of fluid to and from the wave chamber 302.

In the shut-off valve 414, each other guide vane 316F of the first guide vanes 316 may be fixed (immovable) and may be disposed between two movable guide vanes 316M of the first guide vanes 316. As such, the first guide vanes 316 may alternate between fixed and movable guide vanes 316F, 316M, each being configured to direct the incoming fluid (e.g., air) into rotor blades 320. Stated otherwise, the fixed and movable guide vanes 316F and 316M may be sequentially disposed in an alternating pattern in the flow passage 304. The fixed guide vanes 316F may provide a structural connection between the inner and outer circular plates 410, 412 of the shut-off valve 414, and the movable guide vanes 316M may operate between the inner and outer circular plates 410, 412.

Each movable guide vane 316M may be located on a rotary spool 416 configured to rotate the movable guide vane 316M when the rotary spool 416 rotates. The inner surfaces of the rotary spools 416 may conform to (or may be flush with) the inner radial surface of the outer circular plate 412. The outer surface of the rotary spools 416 may extend outside the outer circular plate 412 and a cylindrical actuation spindle 418 may extend from the outer surface of the rotary spools 416.

Figure 4B:
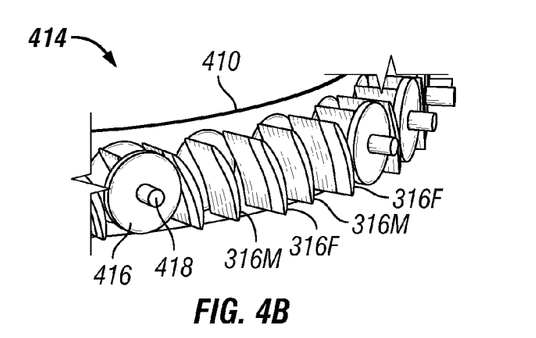
FIGS. 4B and 4C illustrate a portion of a shut-off valve including the first guide vanes with the movable guide vanes in open and closed positions, respectively.
Figure 4C:
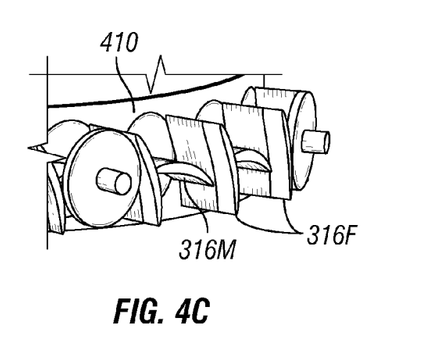
Figure 4D:
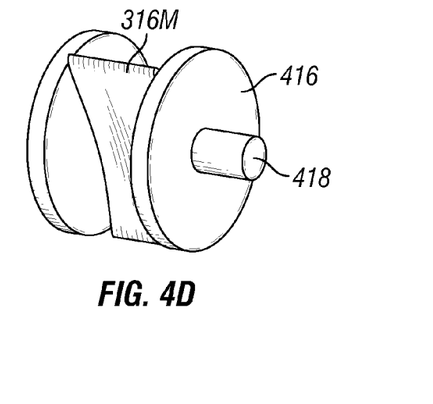
FIG. 4D illustrates a perspective view of an individual rotary spool and a movable guide vane of the shut-off valve.

FIGS. 4B and 4C illustrate a portion of the shut-off valve 414 with the outer circular plate 412 and some of the rotary spools 416 removed. FIG. 4B illustrates the movable guide vanes 316M in an open position. FIG. 4C illustrates the movable guide vanes 316M in a closed position. An actuator (not shown) may be located on or adjacent the outer circular plate 412 or the upper section 402 and may be connected to the cylindrical actuation spindle 418 of the rotary spools 416 via linkages (see below). In an example embodiment, each rotary spool 416 may be operated via a single actuator. In another example embodiment, one actuator may operate two or more rotary spools 416. In either example embodiment, when the rotary spools 416 rotate, the movable guide vanes 316M rotate (for example, about an axis perpendicular to the central axis 303), and leading and trailing edges of the movable guide vanes 316M contact the adjacent fixed guide vanes 316F and place the movable guide vanes 316M in a closed position, as illustrated in FIG. 4C. This may in turn close the first port 312 and prevent fluid from entering the flow passage 304. It should be noted that the leading and trailing edges may refer to the edges of the movable guide vanes 316M with respect to the fluid flow entering the flow passage 304. Herein, the fluid flow contacts the leading edge of the movable guide vanes 316M prior to contacting the trailing edge of the movable guide vanes 316M. FIG. 4D illustrates a perspective view of an individual rotary spool 416 and a movable guide vane 316M.

Figure 5A:
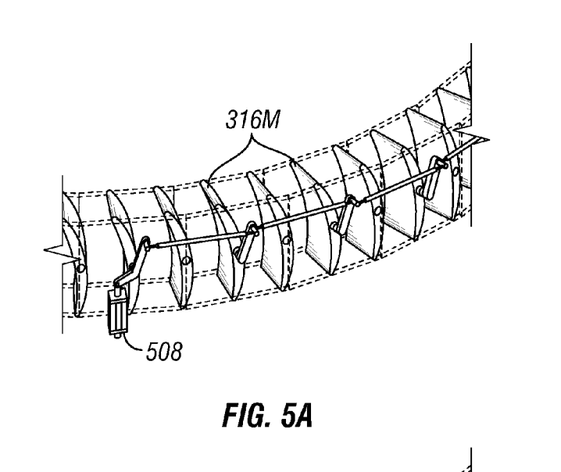
FIGS. 5A-5F illustrate different configurations of linkages used to operate the movable guide vanes of the shut-off valve.
Figure 5B:
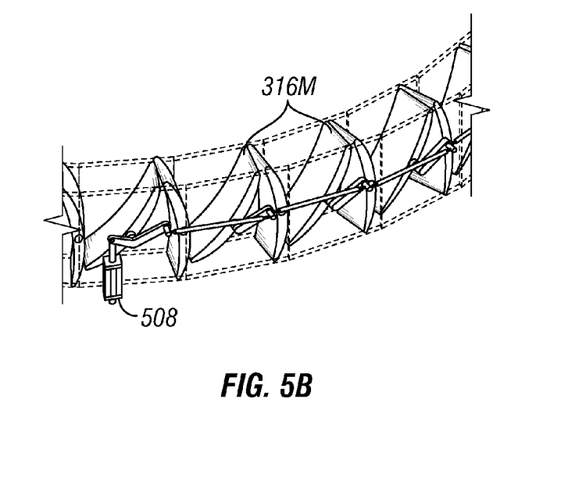
Figure 5C:
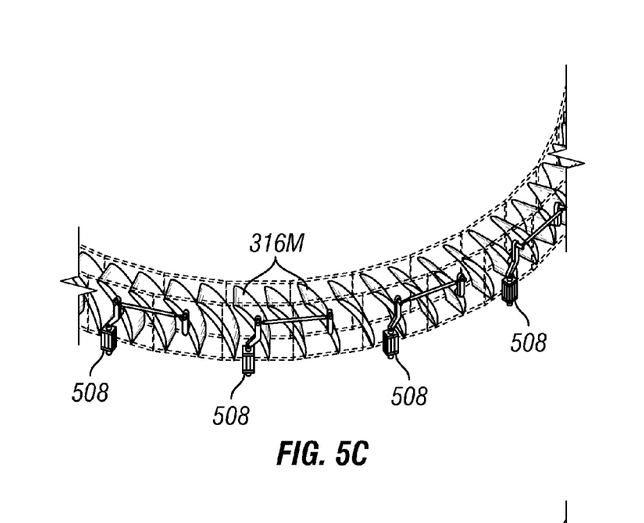
Figure 5D:
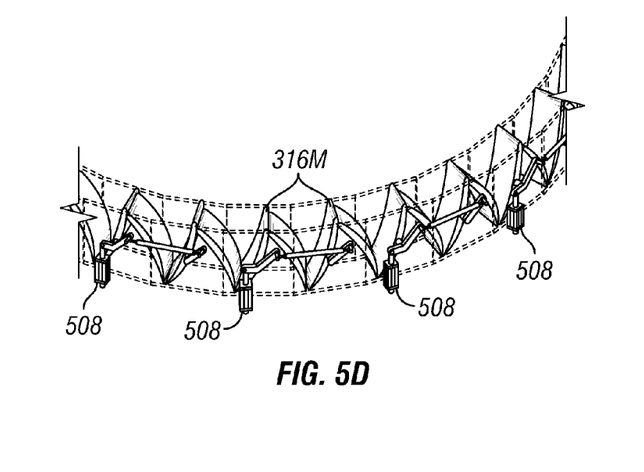
Figure 5E:
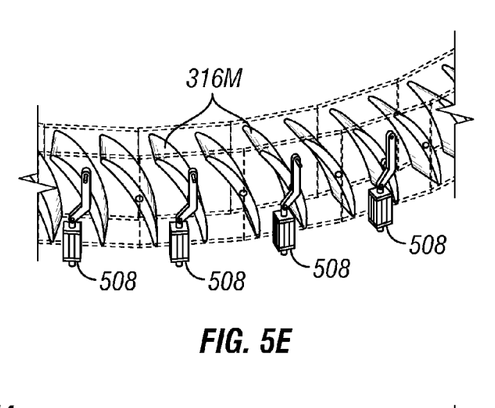
Figure 5F:
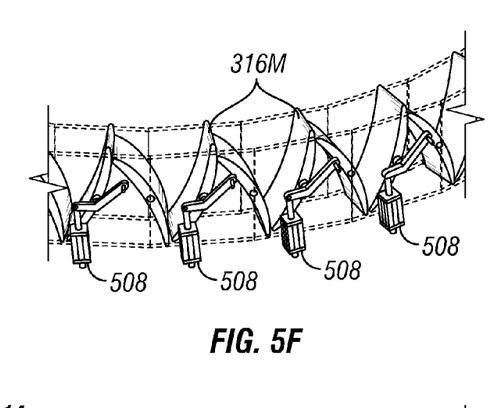

FIGS. 5A-5F illustrate different configurations of linkages used to operate the movable guide vanes 316M of the first guide vanes 316 of the turbine 300. It should be noted that the linkage configurations illustrated in FIGS. 5A-5F may also be used to operate the movable guide vanes 116M of the first guide vanes 116 of the turbine 100. It should also be noted that, alternatively, the system of linkages 210 illustrated in FIG. 2B may be used to operate the movable guide vanes 316M of the first guide vanes 316 of the turbine 300. FIGS. 5A-5D illustrate a single actuator 508 connected to two (FIGS. 5C, 5D) or more (FIGS. 5A, 5B) movable guide vanes 316M. FIGS. 5A and 5C illustrate the movable guide vanes 316M in an open position and FIGS. 5B and 5D illustrate the movable guide vanes 316M in a closed position. FIGS. 5E and 5F illustrate each movable guide vanes 316M being provided with an individual actuator 508. FIG. 5E illustrates the movable guide vanes 316M in an open position and FIG. 5F illustrates the movable guide vanes 316M in a closed position. It should be noted that, although linkage configurations in FIGS. 5A-5F are for a shut-off valve 414 having planar plates (see below), the linkage configurations in FIGS. 5A-5F may also be used with a shut-off valve having circular plates (FIGS. 4A-4D) and/or with guide vanes including rotary spools (FIGS. 4A-4D) discussed above.

Figure 6A:
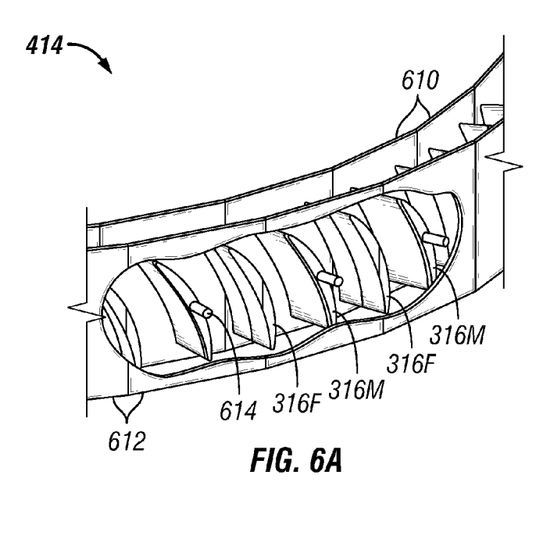
FIGS. 6A and 6B illustrate another shut-off valve, according to example embodiments.
Figure 6B:
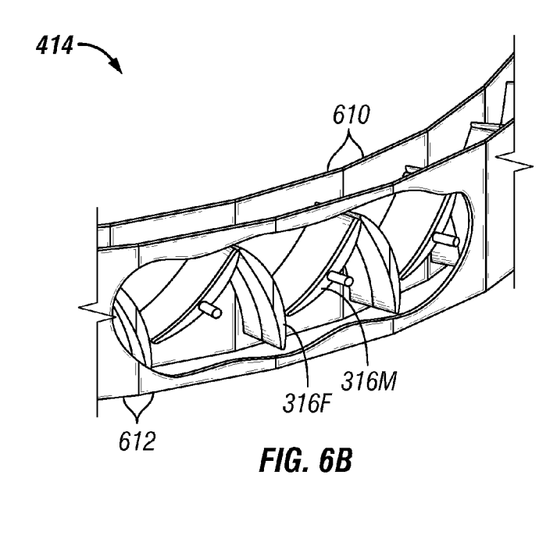

FIGS. 6A and 6B illustrate an example embodiment of the shut-off valve 414. Herein, the inner and outer circular plates 410, 412 of the shut-off valve 414 may be replaced by a series of inner and outer planar plates 610, 612 (also referred to as faceted duct sections) connected to each other. The fixed guide vanes 316F may be attached at the intersection of adjacent pairs of inner and outer planar plates 610, 612. Such an assembly may permit the movable guide vanes 316M to rotate between two parallel inner and outer planar plates 610, 612. As illustrated, an actuation spindle 614 may be coupled to the movable guide vanes 316M and may extend from the outer surface of the outer planar plates 612. The actuator 508 (not illustrated) may be coupled to the actuation spindle 614 and may rotate the movable guide vanes 316M via linkages (for example, the configurations illustrated in FIGS. 5A-5F) attached thereto. FIG. 6A illustrates the movable guide vanes 316M in an open position and FIG. 6B illustrates the movable guide vanes 316M in a closed position.

In example embodiments, the shut-off valve is situated between the oscillating water column chamber and the rotor blades and, as motion of the waves cannot be controlled, the shut-off valve enables the rotor blades (and the rotor) to be isolated from the incoming pneumatic power. This allows the turbine to be stopped (and therefore protected) during periods of excessive input power, for example, during storms, and also for planned shutdown operations such as maintenance activities.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A shut-off valve for a turbine of an oscillating water column, comprising:
   a first plate;
   a second plate opposing the first plate; and
   a plurality of guide vanes disposed between the first plate and the second plate, and configured to control a fluid flow into a flow passage defined by the turbine, the plurality of guide vanes at least partially disposed within the flow passage and including a plurality of fixed guide vanes removably coupled to the first plate and the second plate, and a plurality of movable guide vanes, wherein each movable guide vane of the plurality of movable guide vanes is disposed between two fixed guide vanes of the plurality of fixed guide vanes and configured to contact the two fixed guide vanes.

2. The shut-off valve of claim 1, wherein the plurality of fixed guide vanes and the plurality of movable guide vanes are sequentially disposed in an alternating pattern in the flow passage.

3. The shut-off valve of claim 1, wherein the plurality of movable guide vanes are configured to rotate about an axis parallel to a central axis of the turbine.

4. The shut-off valve of claim 1, wherein the plurality of movable guide vanes are configured to rotate about an axis perpendicular to a central axis of the turbine.

5. The shut-off valve of claim 1, further comprising a plurality of linkages coupled to one or more movable guide vanes of the plurality of movable guide vanes, the plurality of linkages configured to rotate the one or more movable guide vanes.

6. The shut-off valve of claim 5, further comprising a rotary spool coupled to the one or more movable guide vanes of the plurality of movable guide vanes, the rotary spool being coupled to the plurality of linkages and the rotary spool being configured to rotate the movable guide vane coupled thereto.

7. The shut-off valve of claim 1, wherein the shut-off valve is disposed proximal an input port of the turbine and is configured to prevent the fluid flow from entering the flow passage.

8. An oscillating water column turbine, comprising:
   a shaft configured to rotate about a central axis;
   first and second annular ports disposed about the central axis;
   rotor blades coupled with or integral with the shaft and disposed between the first and second annular ports;
   a flow passage extending between the first and second annular ports, the rotor blades intersecting the flow passage; and
   a shut-off valve including:
      a first plate,
      a second plate opposing the first plate,
      a third plate axially spaced from the first plate and the second plate,
      a fourth plate opposing the third plate,
      first guide vanes,
      and second guide vanes,
      the first guide vanes disposed between the first plate and the second plate and proximal the first annular port, the first guide vanes configured to control a first fluid flow into the flow passage, and the first guide vanes including first fixed guide vanes removably coupled to the first plate and the second plate and first movable guide vanes, each first movable guide vane being disposed between two first fixed guide vanes and configured to contact the first two fixed guide vanes, and the second guide vanes disposed between the third plate and the fourth plate and proximal the second port, the second guide vanes configured to control a second fluid flow into the flow passage, the second guide vanes including second fixed guide vanes removably coupled to the third plate and the fourth plate and second movable guide vanes, each second movable guide vane being disposed between two second fixed guide vanes and configured to contact the second two fixed guide vanes.

9. The oscillating water column turbine of claim 8, wherein the first fixed guide vanes and the first movable guide vanes are sequentially disposed in an alternating pattern in the flow passage, and the second fixed guide vanes and the second movable guide vanes are sequentially disposed in an alternating pattern in the flow passage.

10. The oscillating water column turbine of claim 8, wherein the first movable guide vanes are configured to prevent the first fluid flow from entering the flow passage, and the second movable guide vanes are configured to prevent the second fluid flow from entering the flow passage.

11. The oscillating water column turbine of claim 8, further comprising at least one first actuator disposed adjacent the first guide vanes and at least one second actuator disposed adjacent the second guide vanes, the at least one first actuator configured to operate one or more of the first movable guide vanes, and the at least one second actuator configured to operate one or more of the second movable guide vanes.

12. The oscillating water column turbine of claim 11, wherein a rotary spool is coupled to each movable guide vane of the first and second movable guide vanes, and the at least one first and second actuators are configured to rotate the rotary spool to rotate the corresponding first and second movable guide vanes coupled to the rotary spool.

13. The oscillating water column turbine of claim 8, wherein the first and second movable guide vanes are configured to rotate about an axis parallel to the central axis.

14. The oscillating water column turbine of claim 8, wherein the first and second movable guide vanes are configured to rotate about an axis perpendicular to the central axis.

15. The oscillating water column turbine of claim 8, wherein the first and second annular ports are radially oriented with respect to the central axis.

16. The oscillating water column turbine of claim 8, wherein the first and second annular ports are axially oriented with respect to the central axis.

17. An apparatus for extracting energy from a bi-directional fluid flow, comprising:
a shaft configured to rotate about a central axis;
first and second annular ports disposed about the central axis;
a flow passage extending between the first and second annular ports, at least a portion of the flow passage extending axially around the shaft, and the flow passage being configured to receive the bi-directional fluid flow;
rotor blades coupled with or integral with the shaft and intersecting the flow passage, the rotor blades being configured to receive the bi-directional fluid flow and rotate the shaft; and
a shut-off valve including:
a first plate,
a second plate opposing the first plate,
a third plate axially spaced from the first plate and the second plate,
a fourth plate opposing the third plate,
first guide vanes,
and second guide vanes,
the first guide vanes disposed between the first plate and the second plate and proximate the first annular port, the first guide vanes configured to control the bi-directional fluid flow into the flow passage and including first fixed guide vanes removably coupled to the first plate and the second plate and first movable guide vanes, each first movable guide vane being disposed between two first fixed guide vanes and configured to contact the first two fixed guide vanes, and the second guide vanes disposed between the third plate and the fourth plate and proximate the second annular port, the second guide vanes configured to control the bi-directional fluid flow into the flow passage and including second fixed guide vanes removably coupled to the third plate and the fourth plate and second movable guide vanes, each second movable guide vane being disposed between two second fixed guide vanes and configured to contact the second two fixed guide vanes.

18. The apparatus of claim 17, wherein the first fixed guide vanes and the first movable guide vanes are sequentially disposed in an alternating pattern in the flow passage, and the second fixed guide vanes and the second movable guide vanes are sequentially disposed in an alternating pattern in the flow passage.

19. The apparatus of claim 17, wherein the first movable guide vanes are configured to prevent the bi-directional fluid from entering the flow passage, and the second movable guide vanes are configured to prevent the bi-directional fluid from entering the flow passage.

* * * * *